H. MAYTROTT.
LAMP.
APPLICATION FILED NOV. 5, 1913.

1,208,347.  Patented Dec. 12, 1916.

Witnesses:
Carl L. Choate
Horace A. Crossman

Inventor:
Henry Maytrott,
by Emery Booth, Janney & Varney
Att'ys.

UNITED STATES PATENT OFFICE.

HENRY MAYTROTT, OF BRIDGEPORT, CONNECTICUT, ASSIGNOR TO THE HAWTHORNE MANUFACTURING COMPANY, INC., OF BRIDGEPORT, CONNECTICUT, A CORPORATION OF CONNECTICUT.

LAMP.

1,208,347.  Specification of Letters Patent.  Patented Dec. 12, 1916.

Original application filed August 19, 1912, Serial No. 715,783. Divided and this application filed November 5, 1913. Serial No. 799,392.

*To all whom it may concern:*

Be it known that I, HENRY MAYTROTT, a citizen of the United States, and resident of Bridgeport, county of Fairfield, and State of Connecticut, have invented an Improvement in Lamps, of which the following description, in connection with the accompanying drawings, is a specification, like characters on the drawings representing like parts.

This invention relates to lamps, and more particularly to acetylene lamps in which the lamp body and gas generating parts are combined in a single portable apparatus.

The present application is directed to subject matter divided out of my copending application for acetylene lamps Serial No. 715,783, filed August 19, 1912.

Figure 1:
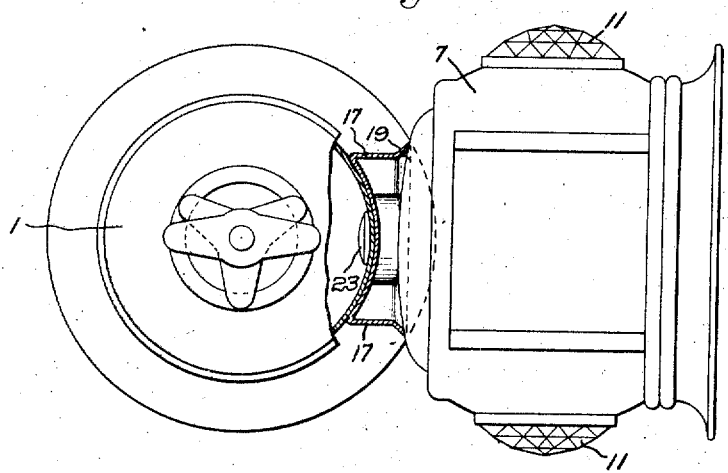
Figure 2:
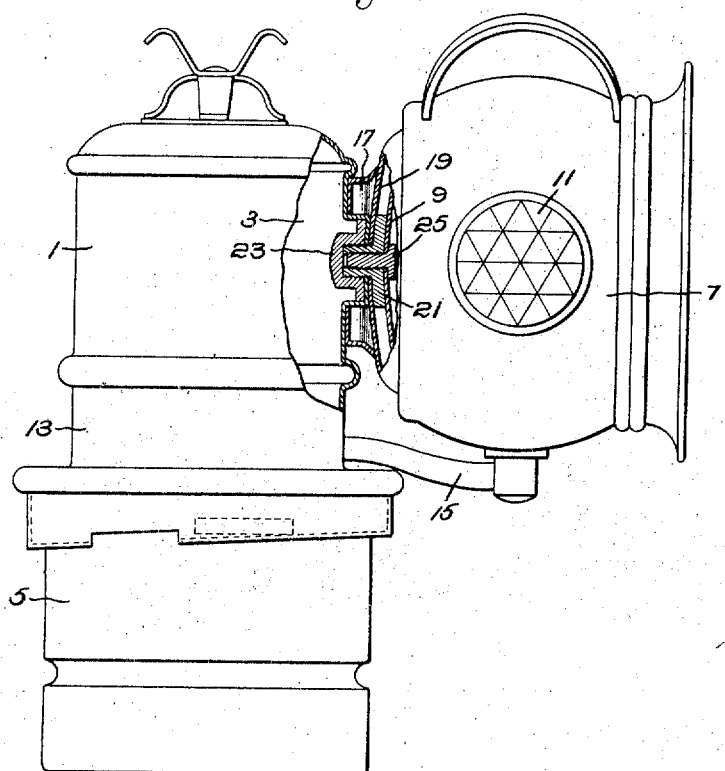

The character of the invention may be best understood by reference to the following description of an illustrative embodiment thereof shown in the accompanying drawing, wherein:

Figure 1 is a plan of an illustrative lamp embodying the invention partially broken away to disclose certain parts thereof in section; and Fig. 2 is a side elevation of the lamp shown in Fig. 1 partially broken away to disclose the parts in section.

Referring to the drawing, the illustrative acetylene lamp shown therein as embodying the invention comprises a gas generator 1 consisting of a water reservoir 3 and a generator cup 5 detachably connected to the water reservoir as by a bayonet joint or threaded connection. Connected to the gas generator 1 is a lamp body 7 provided with a burner, a reflector 9, side lights 11 and other elements of usual construction. Between the cup 5 and the water reservoir 3 is a gas supply portion 13 communicating with the burner of the lamp through a supply pipe 15 connected to the lamp at a point beneath the latter.

In lamps where the lamp body is offset from the generator it frequently happens that the user will unscrew the detachable cup 5 by seizing the cup with one hand and the outer end of the lamp body with the other, thereby tending to twist the lamp body on the generator and tending to break off or injure the pipe connection 15 when such connection is so located as to receive the twisting strain. To avoid any possibility of such occurrence a connection is interposed between the lamp body and generator which will tend to take this twisting strain and relieve the pipe connection 15 therefrom. In the embodiment of the invention shown herein such connection is in the form of an adapter or filler 17 consisting of a cup-like shell of sheet metal shaped to fill in the space between the convex walls of the water reservoir 3 and the sheet metal back 19 of the lamp body. This filler abuts against and conforms to the contour of the surfaces of both the lamp body and the water reservoir so as to form a secure seating member or backing for the lamp body upon the generator, thereby preventing any tendency of the lamp body to rock or move with or about the pipe connection 15. This seating member, in connection with the pipe connection 15, may provide a sufficiently rigid connection for the lamp body to the generator, but to add to the security of the connection the back 19 of the lamp body may be rigidly attached to the water reservoir by a threaded member or screw 21 having a flanged head overlying the back 19 and its shank entered through registering apertures in said back 19 and the wall of the water reservoir. This screw projects in somewhat beyond the wall of the water reservoir and receives a suitable coöperating member such as the flanged nut 23 preferably seated in a recess in the wall of said reservoir. When the nut is set up on said screw it will securely clamp the lamp back 19 against the wall of the reservoir and also secure the seating member in place between them. When the lamp and reservoir are thus drawn together the member 17 because of its flared edge, clearly shown in the figures, will tend to be slightly sprung and thus forms a resilient bracing connection throughout a circular area of which the screw is the center. The connection is consequently very firm and there is no lost motion. In fact the connecting member acts with respect to the screw very much as would a lock washer. The screw 21 may also serve to assist in holding the reflector 9 in place. To this end said screw is tapped out to receive a member in the form of a screw 25 having a flanged head overlying the reflector 9 and securing the same against the flanged head of the screw 21.

By the construction described there is provided a simple and effective device for securing the lamp to the generator with a firm seating so that there will be no possibility of twisting the lamp relatively to the generator in the manipulation of the lamp. The connection also provides effective means for preventing any dislocation of the lamp relatively to the generator in experiencing the vibration which such lamps may be subject to in use.

Having described one illustrative embodiment of the invention without limiting the same thereto, what I claim as new and desire to secure by Letters Patent is:

1. In a lamp the combination of a fuel containing portion with a lamp body offset at one side thereof; a supply pipe connecting said lamp body and said fuel containing portion; a central connecting member between said body and said portion and a seating member interposed between the same and resiliently bracing the same apart in a zone spaced from and surrounding said connection.

2. In a lamp the combination of a fuel containing portion with a lamp body offset at one side thereof; a supply pipe connecting the lamp body and fuel containing portion; a curvilinear conformable seating member having an outwardly flaring edge to engage the lamp back and conform to the outline thereof between the lamp back and fuel containing portion whereby movement of the lamp body relatively to the fuel containing portion is prevented; and means coöperating with said seating member to lock the lamp body to the fuel containing portion.

3. In a lamp a combined body and reflector securing device for securing the same to a support, comprising a threaded member having a relatively wide flanged head, said member adapted to engage and extend through the lamp body and said support, a coöperating member to lock the threaded member therein, the threaded member being tapped, a second member extended through the reflector and threaded to the first named threaded member for locking the reflector to the flanged head of said member.

4. In a lamp the combination of a fuel containing portion with a lamp body offset at one side thereof; a supply pipe connecting the lamp body and fuel containing portion; a cup like, conformable seating member interposed between said containing portion and lamp body and having a bottom conforming to one of said members and a flared edge conforming to the other of said members and means coöperating with said seating member to lock the lamp body to the fuel containing portion.

In testimony whereof, I have signed my name to this specification, in the presence of two subscribing witnesses.

HENRY MAYTROTT.

Witnesses:
ELLSWORTH A. HAWTHORNE,
E. HORACE HAWTHORNE.